C. RINCK.
BAKE OVEN.
APPLICATION FILED SEPT. 3, 1919.
1,345,107.
Patented June 29, 1920.
2 SHEETS—SHEET 2.
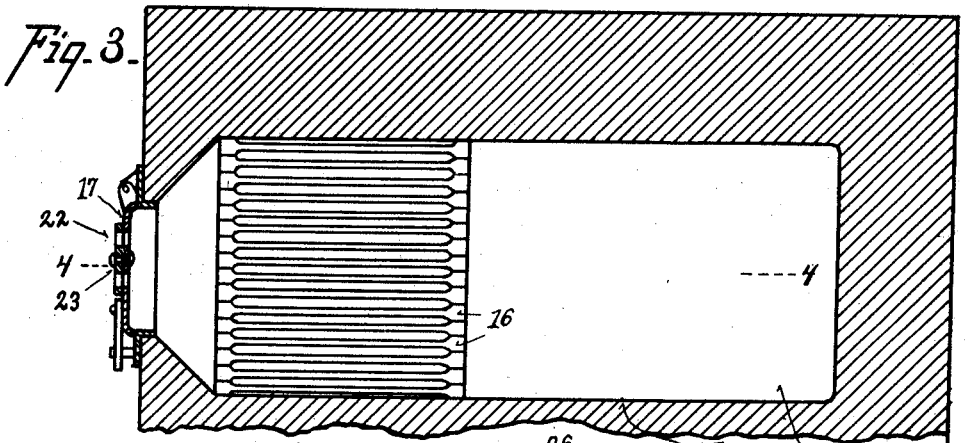
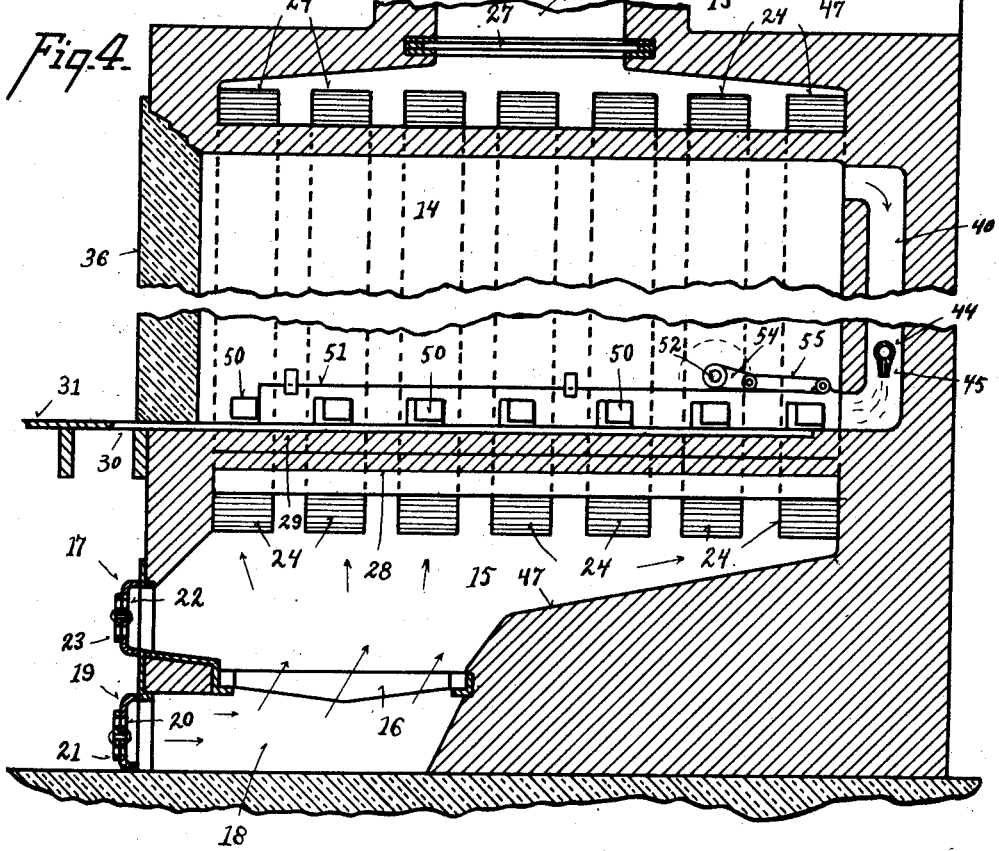
Charles Rinck, Inventor
By C. W. Miles, Attorney

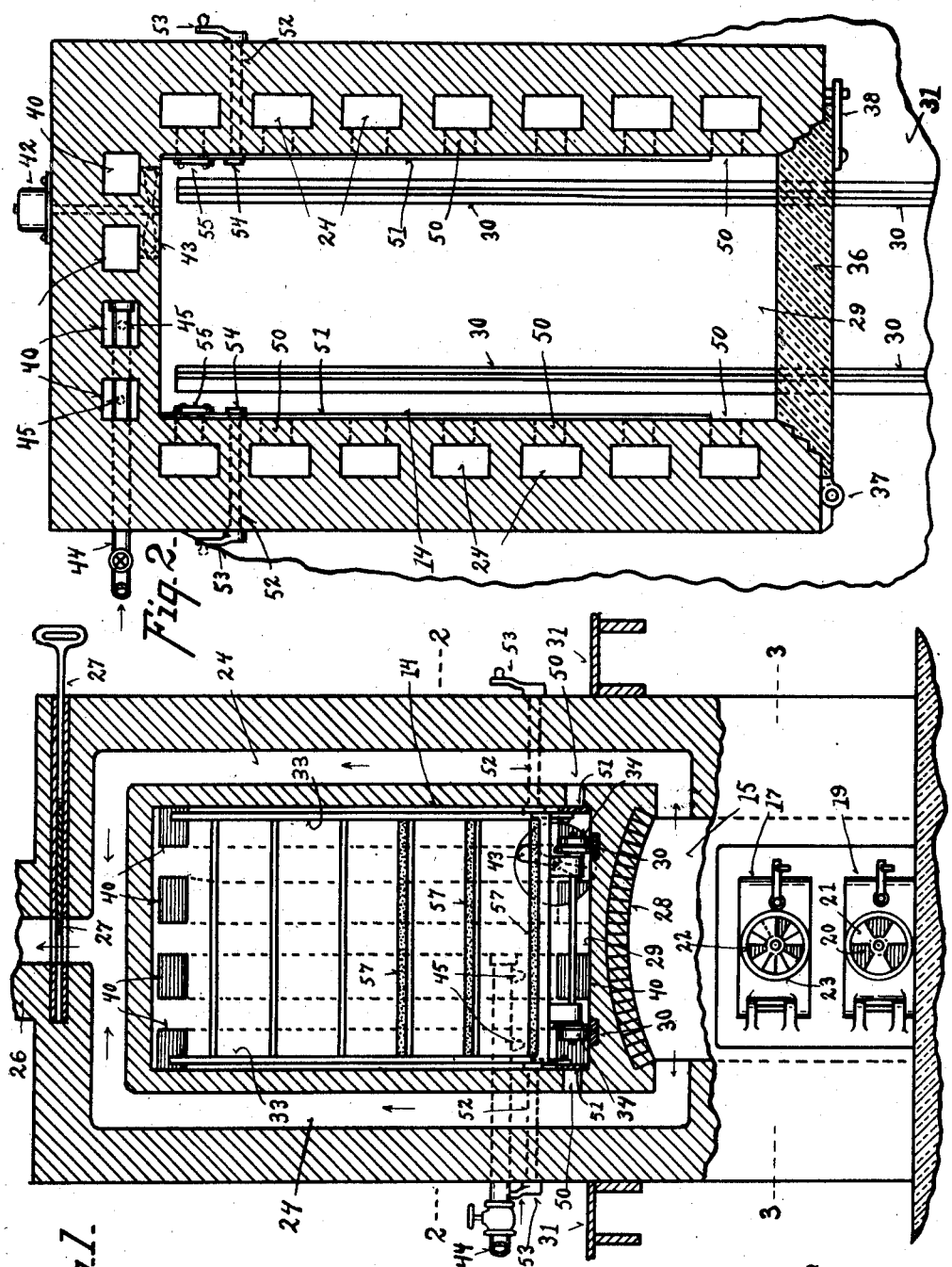

UNITED STATES PATENT OFFICE.

CHARLES RINCK, OF CINCINNATI, OHIO.

BAKE-OVEN.

1,345,107.  Specification of Letters Patent.  Patented June 29, 1920.

Application filed September 3, 1919. Serial No. 321,429.

*To all whom it may concern:*

Be it known that I, CHARLES RINCK, a citizen of the United States, residing at Cincinnati, in the county of Hamilton and State of Ohio, have invented certain new and useful Improvements in Bake-Ovens, of which the following is a specification.

My invention relates to improvements in bake-ovens. One of its objects is to provide an improved oven in which a large quantity of material to be baked may conveniently be introduced at one time and removed at one time. Another object is to provide an improved oven in which a larger quantity of material to be baked may be handled with a given amount of fuel, investment and occupied space. Another object is to provide for maintaining substantially uniform temperatures in all portions of the oven. Another object is to provide improved means to regulate the humidity conditions in the oven. Another object is to provide an improved system of fire-box, flues, and draft regulation, and means to carry out the same. My invention also comprises certain details of form, combination, and arrangement, all of which will be fully set forth in the description of the accompanying drawings, in which:

Figure 1 is a front elevation, partly in section, of a bake-oven embodying my improvements.

Fig. 2 is a horizontal section on line 2 2 of Fig. 1.

Fig. 3 is a horizontal section on line 3 3 of Fig. 1.

Fig. 4 is a vertical section on line 4 4 of Fig. 3.

The accompanying drawings illustrate the preferred embodiments of my invention, in which 14 represents the oven chamber, 15 represents the fire box, 16 the grate-bars, 17 the firing-door, 18 the ash-pit, and 19 the ash-pit door. The air supply for combustion is supplied through the draft ports 20 of the ash-pit door, regulated by the adjustable shutter 21, and also if required by the draft ports 22 of the fire-door and the adjustable shutter 23 therefor. The heated products of combustion from a fire built upon the grate-bars is conducted upwardly and rearwardly and enters the several vertical flues 24 leading from opposite sides of the fire-box upwardly along the sides of the oven-chamber, and thence across the top of the oven chamber to the stack entrance 26. An adjustable damper 27 provides for regulating the escape of the products of combustion from the flues 24 to the stack. An arch 28 and floor 29 serve to separate the oven chamber from the fire-box beneath it, and said floor is thereby directly heated by conduction upwardly from the fire-box.

Tracks 30 are laid upon the floor 31 in front of the oven chamber and extend therefrom into the oven chamber to provide for conveniently introducing and removing the portable racks 33, which are mounted upon wheels 34, which travel preferably upon the tracks 30, but may if desired be made to travel directly upon the oven floor. The racks 33, of which there are several employed, are of metal, of considerable height and length relative to their width, and thereby for baking in pans provide space to receive a large number of bread-pans or other containers for articles to be baked, and also provide for the convenient introduction and removal of such pans or containers from one or both sides of said racks. At the front the oven chamber is opened and closed by means of a close fitting door 36, hinged to the outer wall of the oven at 37, and provided with a suitable latch mechanism 38 to hold the door in closed position during the baking operation. Thus the oven may be operated practically continuously, as one or more racks of material to be baked are being prepared while one is in the oven, and when one rack of material has been baked, it is wheeled out of the oven and another rack is wheeled into position and is ready for the baking operation thereon to commence without delay.

As the oven chamber is of unusual height and depth relative to its floor space and width there is a tendency for the temperature within the oven chamber to vary in different parts thereof, and in order to maintain a substantially uniform temperature in all parts of the oven chamber I provide one or more, preferably several conduits 40 leading from near the top to near the bottom of the oven chamber, with means to cause a downwardly directed current of heated air through said conduits from the upper to the lower portion of said oven chamber to thereby mix and circulate the gaseous contents of the oven chamber and thereby prevent it from separating into different layers and pockets of different temperatures. As illustrated in Fig. 2 the conduits 40 are all located in the rear wall, but a portion or all of them may be otherwise located if desired. Also as illustrated in Fig. 2 an electric motor 42 is employed to drive a circulating fan 43 to maintain a circulation in one or more of the conduits 40, while a pipe 44 provided with nozzles 45, and a supply of steam under pressure provides for directing steam jets downwardly into one or more of the conduits 40 to cause a downwardly directed circulation therein, and at the same time to increase the water vapor contents of the oven chamber until the gaseous content of the oven reaches the desired condition as to moisture contents to secure the best results in baking, which should be rather high. Either or both methods of circulating the oven gaseous contents may be employed as may be necessary to maintain the heat or to increase the moisture contents.

In the fire-box at the rear of the grate bars is an upwardly sloping fire-bridge 47 over which the flames play on their way to the rearwardly located flues 24, thereby promoting complete combustion by a reflection of heat through the products of combustion from said fire-bridge to the arch 28, and from said arch toward the fire-bridge, and thereby also providing for a high degree of heat at the floor of the oven, and a substantially uniform heat at the oven floor, and also a high fuel economy. The grate bars and fire, being close to the fire door enable the fire to be conveniently reached and attended to, and a relatively small grate surface and deep fuel bed to be employed compared with the several dimensions of the oven chamber to be heated. The inner face of the oven door is preferably of asbestos material of good non-conducting quality, and the door is arranged to fit closely to its frame or jamb to avoid the escape of gases from the oven between the door and its jamb.

In addition to the indirect heating of the oven chamber by conduction through the floor from the fire-box and through the walls of the oven chamber from the flues 24, I also provide for directly heating the oven chamber by introducing a portion of the flue gases from flues 24 into the oven chamber near the bottom thereof through the ports 50 leading from flues 24 to the oven chamber, and which ports are preferably controlled by sliding gates or dampers 51 actuated by crank shafts 52 having hand cranks 53 outside of the oven and cranks 54 in the oven chamber, which cranks are connected by links 55 to said dampers 51 to open or close the ports 50.

When the damper 27 is open there is practically no tendency for flue gases to enter the oven chamber through the ports 50, but when the fire in the fire box is clear, or low, or in suitable condition, the damper 27 may be closed which will tend to drive flue gases through the ports 50 into the oven chamber to thereby increase the temperature and secure quick, direct, and economical heating of the oven chamber. I have illustrated the fire-box as adapted to use solid fuel upon grate-bars, but gas or oil fuel with suitable burners therefor may be employed if desired where available.

Where it is desired to bake bread without the use of fats, as for instance French bread, I provide racks 33 having slabs or plates 57, see Fig. 1, of non metallic substance, as for instance soap-stone, asbestos-slate, or fire-clay, to the surface of which the bread will not adhere, and upon which slabs the bread may be placed directly in large quantities before the rack is placed in the oven chamber, instead of placing the bread in pans and the pans upon the rack as heretofore described. The bread baked upon non-metallic supports and without the use of fats is of different quality from that baked in pans.

I am thus enabled to secure more perfect control of the temperatures and conditions in the oven chamber suitable for baking, and to provide a greater variety of products with a single oven than heretofore.

The apparatus herein illustrated and described is capable of considerable modification without departing from the principle of my invention.

What I claim is:

1. A bake-oven comprising a fire-box, an oven chamber of greater depth than width above and separated from said fire-box by a floor heated from said fire-box, substantially vertical flues leading from said fire-box along the side walls of said oven chamber and across the top of said oven chamber to heat the side and top walls of said oven chamber, a door of substantially the full height of said oven chamber in one wall thereof, to permit the introduction and removal of portable racks carrying the goods to be baked, a circulating conduit leading from the upper portion of said oven chamber to the lower portion of said oven chamber, and means to cause a gaseous circulation from one portion of said oven chamber to another through said conduit.

2. A bake-oven comprising a fire-box, an oven chamber of greater depth than width located above and separated from said fire-box by a floor heated from said fire-box, substantially vertical flues leading from said fire box along the side walls of said oven chamber to heat the side walls of said oven chamber, a door constituting substantially one entire wall of said oven chamber, to permit the introduction and removal of portable racks carrying the goods to be baked in tiers one above another, a circulating conduit leading from the upper portion of said oven chamber to the lower portion of said oven chamber, and means to cause a gaseous circulation from one portion of said oven chamber to another through said conduit.

3. A bake-oven comprising a fire-box, an oven chamber of sufficient height to receive numerous tiers of goods to be baked vertically one above another above and separated from said fire-box by a floor heated from said fire-box, flues leading in a vertical direction from said fire-box along the side walls of said oven chamber to heat the side walls of said oven chamber, a floor constituting substantially one entire wall of said oven chamber, a circulating conduit leading from the upper portion of said oven chamber to the lower portion of said oven chamber, means to cause a circulation of the gaseous contents of said oven chamber from one portion thereof to another through said conduit, and means to introduce a regulated amount of water vapor into said oven chamber.

4. A bake-oven comprising a fire-box, an oven chamber of sufficient height to accommodate numerous tiers of goods to be baked one above another, an oven chamber door constituting the major portion of one wall of said oven chamber, a flue leading from said fire box to indirectly heat the wall of said oven chamber, a stack to conduct away the waste gases from said flue, a regulating damper to regulate the escape of the gases from said flue to said stack, a port leading from said flue to said oven chamber through which said oven chamber may be directly heated by introducing gases from the flue to the oven chamber by checking the escape of gases from the flue to the stack, and means to circulate the gaseous contents of said oven chamber from one part thereof to another part thereof.

5. A bake-oven comprising a fire-box, an oven chamber of sufficient height to accommodate numerous tiers of goods to be baked one above another, an oven chamber door constituting the major portion of one wall of said oven chamber, a flue leading from said fire-box to indirectly heat the wall of said oven chamber, a port leading from said flue to said oven chamber through which flue gases may be admitted to said oven chamber, and means to selectively direct the flue gases to directly or indirectly heat said oven chamber, and means to circulate the gaseous contents of said oven chamber from one part thereof to another and a plurality of portable racks to support numerous tiers of goods to be baked one above another and to be introduced into and removed from said oven in loaded condition.

In testimony whereof I have affixed my signature.

CHARLES RINCK.

Correction in Letters Patent No. 1,345,107.

It is hereby certified that in Letters Patent No. 1,345,107, granted June 29, 1920, upon the application of Charles Rinck, of Cincinnati, Ohio, for an improvement in "Bake-Ovens," an error appears in the printed specification requiring correction as follows: Page 3, line 14, claim 3, for the word "floor" read *door;* and that the said Letters Patent should be read with this correction therein that the same may conform to the record of the case in the Patent Office.

Signed and sealed this 10th day of August, A. D., 1920.

[SEAL.]
M. H. COULSTON,
*Acting Commissioner of Patents.*

Cl. 107—55.